(12) United States Patent
Seok et al.

(10) Patent No.: US 12,247,930 B2
(45) Date of Patent: Mar. 11, 2025

(54) INSPECTION APPARATUS AND INSPECTION METHOD FOR DISPLAY DEVICE

(71) Applicant: Samsung Display Co., LTD., Yongin-si (KR)

(72) Inventors: Sangjun Seok, Seoul (KR); Namhyuk Kim, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 213 days.

(21) Appl. No.: 17/888,694

(22) Filed: Aug. 16, 2022

(65) Prior Publication Data
US 2023/0123595 A1  Apr. 20, 2023

(30) Foreign Application Priority Data
Oct. 14, 2021  (KR) .................. 10-2021-0136554

(51) Int. Cl.
*G01N 21/958*  (2006.01)
*G01N 21/93*  (2006.01)

(52) U.S. Cl.
CPC .......... *G01N 21/958* (2013.01); *G01N 21/93* (2013.01); *G01N 2201/066* (2013.01); *G01N 2201/12784* (2013.01)

(58) Field of Classification Search
CPC ............... G01N 21/958; G01N 21/93; G01N 2201/066; G01N 2201/12784; G01N 21/95; G01N 2021/8829; G01N 2021/9513; G01N 21/8806; G01N 21/8851; G01N 21/956; G01B 11/2504; G01B 11/2513; G01R 31/2825
(Continued)

(56) References Cited

U.S. PATENT DOCUMENTS

2006/0132606 A1*  6/2006  Lan ...................... H04N 17/002
                                                                   348/E17.002
2006/0181700 A1*  8/2006  Andrews ............ G01N 21/4738
                                                                   356/237.2
(Continued)

FOREIGN PATENT DOCUMENTS

CN          112082512          12/2020
JP          H11-153420          6/1999
(Continued)

OTHER PUBLICATIONS

Extended European Search Report for European Application No. 22201635.4 dated Mar. 21, 2023.

*Primary Examiner* — Md M Rahman
(74) *Attorney, Agent, or Firm* — KILE PARK REED & HOUTTEMAN PLLC

(57) ABSTRACT

An embodiment provides an inspection apparatus for a display device, including: a light supplier that supplies light to a surface of the display device; an inspection pattern portion positioned between the display device and the light supplier; a measurement portion that measures reflected light reflected from the surface of the display device; and a processor that processes data of the reflected light measured by the measurement portion, wherein the processor includes a calibration data portion including calibration data and a calibrator calibrating the data using the calibration data of the calibration data portion.

11 Claims, 14 Drawing Sheets

(58) Field of Classification Search
USPC .................................................... 356/239.1
See application file for complete search history.

(56) References Cited

U.S. PATENT DOCUMENTS

| | | |
|---|---|---|
| 2009/0141287 A1 | 6/2009 | Sato et al. |
| 2017/0003232 A1 | 1/2017 | Addington et al. |
| 2021/0299879 A1* | 9/2021 | Pinter ................... B25J 9/1697 |

FOREIGN PATENT DOCUMENTS

| | | |
|---|---|---|
| JP | 4479877 | 6/2010 |
| KR | 10-0951814 | 4/2010 |
| KR | 10-2019-0027295 | 3/2019 |
| KR | 10-2020-0074299 | 6/2020 |
| KR | 10-2264682 | 6/2021 |

\* cited by examiner

INSPECTION APPARATUS AND INSPECTION METHOD FOR DISPLAY DEVICE

CROSS-REFERENCE TO RELATED APPLICATION(S)

This application claims priority to and benefits of Korean Patent Application No. 10-2021-0136554 under 35 U.S.C. § 119, filed in the Korean Intellectual Property Office on Oct. 14, 2021, the entire contents of which are incorporated herein by reference.

BACKGROUND

1. Technical Field

The disclosure relates to an inspection apparatus and an inspection method for a display device.

2. Description of the Related Art

It may be necessary to inspect a display device after the display device is manufactured.

An inspection step of the display device may include inspection of whether light incident from the outside is distorted on a surface of the display device that may be visually recognized by a user.

Multiple layers, such as signal lines, transistors, and emission layers, may be formed inside the display device, a number of layers or a thickness of the layers may be different depending on a position thereof, and a layer for planarization may be formed on a region including layers having different numbers and thicknesses. Accordingly, a surface quality inspection result actually measured on a planarized layer on an outer surface of the display device may be different from a result of distortion of light that a user can actually visually recognize from the outside due to a difference in the number and thickness of inner layers.

The above information disclosed in this Background section is only for enhancement of understanding of the background of the described technology, and therefore, it may contain information that does not form the prior art that is already known in this country to a person of ordinary skill in the art.

SUMMARY

Embodiments have been made in an effort to provide an inspection apparatus and an inspection method for a display device, capable of increasing accuracy of quality inspection by reducing a difference between a surface quality inspection result measured on an outer surface of the display device and a distortion result of light that a user can actually visually recognize from the outside.

However, problems solved by the embodiments are not limited to the above-described problem. Other aspects of the disclosure will be apparent to one of ordinary skill in the art.

An embodiment provides an inspection apparatus for a display device that may include a light supplier that supplies light to a surface of the display device, an inspection pattern portion between the display device and the light supplier, a measurement portion that measures reflected light reflected from the surface of the display device, and a processing portion that processes data of the reflected light measured by the measurement portion. The processing portion may include a calibration data portion including calibration data, and a calibrator calibrating the data by using the calibration data of the calibration data portion.

A first direction that may be perpendicular to the surface of the display device and a second direction that may be perpendicular to a surface of the inspection pattern portion may form an angle with each other.

The angle may be in a range of about 0 degrees to about 45 degrees

The angle may be in a range of about 0 degrees to about 30 degrees.

The inspection pattern portion may include light-blocking portions arranged to have an interval, and a light-transmitting portion positioned between two adjacent ones of the light-blocking portions.

A distance between the two adjacent ones of the light blocking portions may be different depending on positions of the two adjacent ones.

The inspection pattern portion may include light-transmitting portions having a uniform shape in plan view and are disposed at a regular interval.

The measurement portion may include a camera that detects the reflected light.

The processing portion may include an algorithmized program.

The processing portion may detect linear distortion of the reflected light and planar distortion of the reflected light.

The processing portion may determine the linear distortion of the reflected light by calculating a ratio of a width of the inspection pattern portion to a width of the reflected light.

The planar distortion of the reflected light may include an orange peel and a refracting power of the reflected light.

The processing portion may determine whether the reflected light has an abnormal defect, and may determine a ratio of the abnormal defect.

An embodiment provides an inspection method for a display device that may include supplying light that has passed through an inspection pattern portion to a surface of the display device, measuring reflected light reflected from the surface of the display device, determining a linear distortion by using the measured reflected light, determining a planar distortion by using the measured reflected light, and calibrating the linear distortion and the planar distortion using calibration data.

The inspection method may further include dividing the surface of the display device into measurement areas.

The inspection pattern portion may be inclined such that a first direction that may be perpendicular to the surface of the display device and a second direction that may be perpendicular to a surface of the inspection pattern portion form an angle with each other.

The angle may be in a range of about 0 degrees to about 45 degrees.

The determining of the linear distortion, the determining of the planar distortion, and the calibrating may be performed with an algorithmized program.

The determining of the linear distortion may include calculating a ratio of a width of the inspection pattern portion to a width of the reflected light.

The determining of the planar distortion may include measuring a refracting power of the reflected light in the measurement areas, determining whether an orange peel has occurred in the measurement areas by using the refracting power, and determining whether the reflected light has an abnormal defect and determining a ratio of the abnormal defect.

In accordance with an inspection apparatus and an inspection method for a display device according to embodiments, it may be possible to increase accuracy of quality inspection by reducing a difference between a surface quality inspection result measured on an outer surface of the display device and a distortion result of light that a user can actually visually recognize from the outside.

However, effects of the embodiments are not limited to the above-described effects. Other effects will be apparent to one of ordinary skill in the art.

DETAILED DESCRIPTION OF THE EMBODIMENTS

Figure 1:
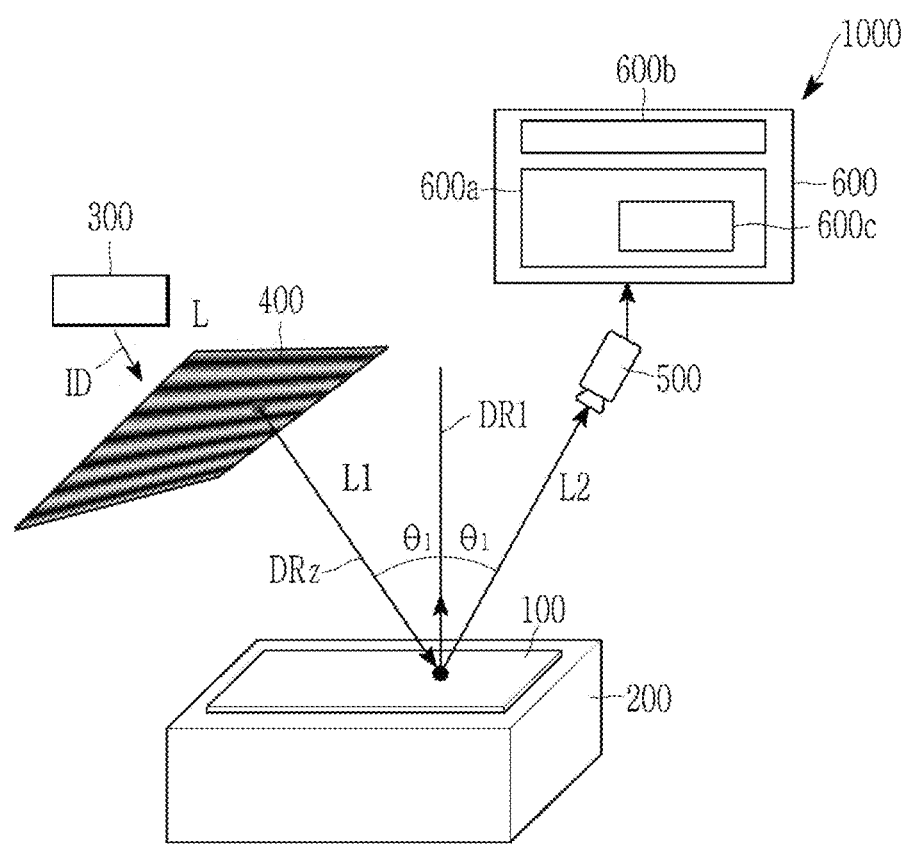
FIG. 1 illustrates a schematic view of an inspection apparatus for a display device according to an embodiment.

The disclosure will be described more fully hereinafter with reference to the accompanying drawings, in which embodiments are shown. As those skilled in the art would realize, the described embodiments may be modified in various different ways, all without departing from the spirit or scope of the disclosure.

To clearly describe the disclosure, parts that are irrelevant to the description may be omitted, and like numerals refer to like or similar constituent elements throughout the specification.

The accompanying drawings are provided only in order to allow embodiments disclosed in the specification to be easily understood and are not to be interpreted as limiting the spirit disclosed in the specification, and it is to be understood that the disclosure includes all modifications, equivalents, and substitutions.

Further, since sizes and thicknesses of constituent members shown in the accompanying drawings may be arbitrarily given for better understanding and ease of description, the disclosure is not limited to the illustrated sizes and thicknesses. In the drawings, the thicknesses of layers, films, panels, regions, etc., may be exaggerated for clarity. In the drawings, for better understanding and ease of description, the thicknesses of some layers and areas may be exaggerated.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

It will be understood that when an element such as a layer, film, region, or substrate is referred to as being "on" another element, it can be directly on the other element or intervening elements may also be present. In contrast, when an element is referred to as being "directly on" another element, there may be no intervening elements present. Further, in the specification, the word "on" or "above" means positioned on or below the object portion, and does not necessarily mean positioned on the upper side of the object portion based on a gravitational direction.

Unless explicitly described to the contrary, the words "comprise", "have", and "include" and variations thereof will be understood to imply the inclusion of stated elements but not the exclusion of any other elements.

Further, in the specification, the phrase "in a plan view" means when an object portion is viewed from a position (e.g., above), and the phrase "in a cross-sectional view" means when a cross-section taken by vertically cutting an object portion is viewed from a position (e.g., the side).

In the specification, "connected" means that two or more components are not only directly connected, but two or more components may be connected indirectly through other components, physically connected and/or electrically connected.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

First, an inspection apparatus 1000 for a display device according to an embodiment will be described with reference to FIG. 1. FIG. 1 illustrates a schematic view of an inspection apparatus for a display device according to an embodiment.

The inspection device 1000 according to an embodiment may include a support 200 for supporting a target display device 100 to be inspected, a light supplier 300 for supplying external light to the display device 100, an inspection pattern portion 400 positioned between the light supplier 300 and the display device 100, a measurement portion 500 for measuring reflected light reflected from the display device 100 after passing through the inspection pattern portion 400 and being incident on a surface of the display device 100, and a processor (processing portion) for performing quality inspection by receiving measured data from the measurement portion 500.

The inspection pattern portion 400 may include multiple light-blocking portions arranged to have an interval and a light-transmitting portion between two adjacent light-blocking portions. The interval between the adjacent light-blocking portions of the inspection pattern portion 400 may not be constant, and thus light passing through the inspection pattern portion 400 may be a sinusoidal pattern in the form of a sine wave.

The inspection pattern portion 400 may include multiple light-transmitting portions having a uniform planar shape and positioned at a regular interval. For example, the light-transmitting portion may have a polygonal planar shape such as a quadrangle.

The inspection pattern portion 400 may be inclined to form a first angle θ1 with the surface of the display device 100. More specifically, the inspection pattern portion 400 may be inclined such that a first direction DR1 perpendicular to the surface of the display device 100 and the second direction DRz perpendicular to the surface of the inspection pattern portion 400 form the first angle θ1.

Light L emitted from the light supplier 300 may be incident on the inspection pattern portion 400 along a third direction ID parallel to the second direction DRz perpendicular to the surface of the inspection pattern portion 400. For example, the light supplier 300 may supply the light L so as to be perpendicular to the surface of the inspection pattern portion 400. However, the disclosure is not limited thereto, and an incident angle of the light L may be adjusted as needed.

The light supplier 300 may be positioned to be spaced apart from the inspection pattern portion 400 by an interval, and for example, a distance between the light supplier 300 and the inspection pattern portion 400 may be adjusted such that the light L emitted from the light supplier 300 can be simultaneously supplied to the inspection pattern portion 400. However, the disclosure is not limited thereto, and the distance between the light supplier 300 and the inspection pattern portion 400 may be adjustable.

The light supplier 300 may include a planar light source, a linear light source, and/or a point light source, and the planar light source, the linear light source, or the point light source may include a fluorescent lamp, an LED, or the like. However, the disclosure is not limited thereto, and a shape or type of the light source of the light supplier may be changed.

The light L supplied from the light supplier 300 to the inspection pattern portion 400 may be incident on the display device 100 to have an incident angle of the first angle θ1 after passing through the inspection pattern portion 400 in a direction parallel to the second direction DRz, the light L1 incident on the display device 100 may be reflected from the surface of the display device 100 to have a reflection angle of the first angle θ1, and reflected light L2 may be measured by the measurement portion 500.

The first angle θ1 may be about 0 degrees to about 45 degrees, and in an embodiment, may be greater than about 0 degrees and less than about 30 degrees.

The measurement portion 500 may include a camera capable of detecting or measuring reflected light.

The processor 600 may include a calculator 600a for obtaining desired data by using data measured from the measurement portion 500 and a calibration data portion 600b for storing calibration data therein, and the calculator 600a may include a calibrator 600c that calibrates data by using the data of the calibration data portion 600b.

The calculator 600a and the calibrator 600c of the processor 600 may be algorithmized programs, but the disclosure is not limited thereto.

The quality of the display device 100 may be finally inspected by using the data calibrated by the processor 600.

Figure 2:
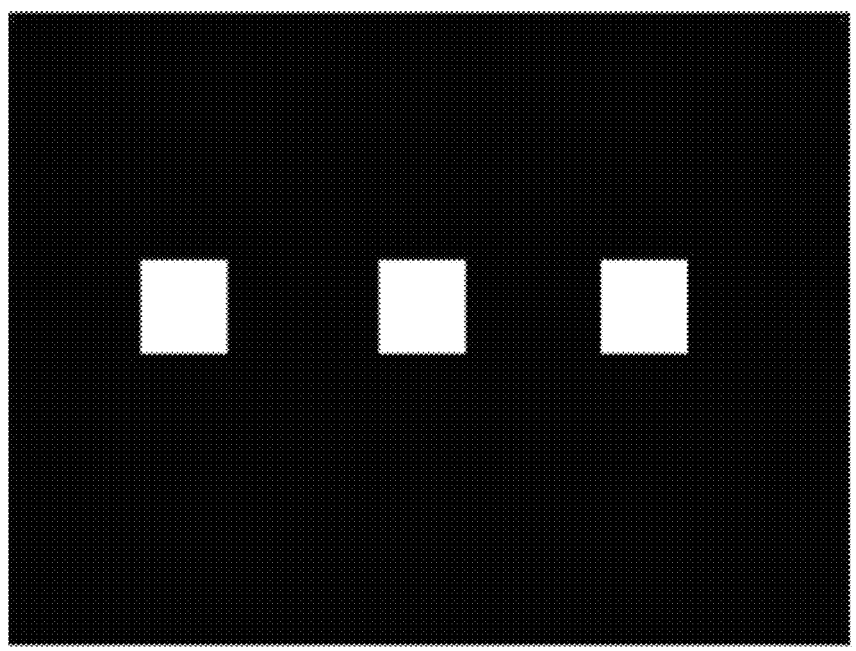
FIG. 2 to FIG. 4 each schematically illustrate an example of an inspection pattern portion of an inspection apparatus for a display device according to an embodiment.
Figure 3:
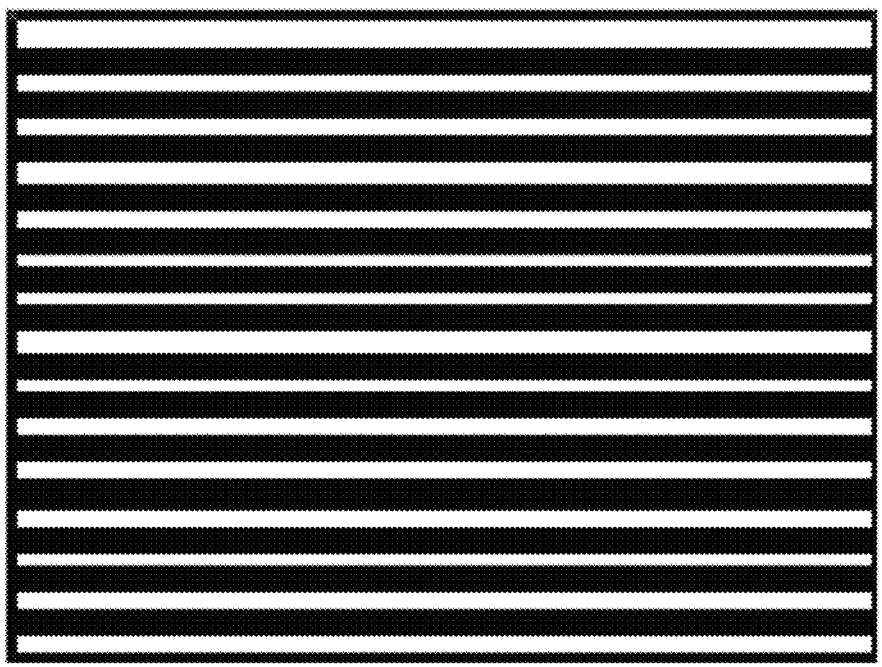
Figure 4:
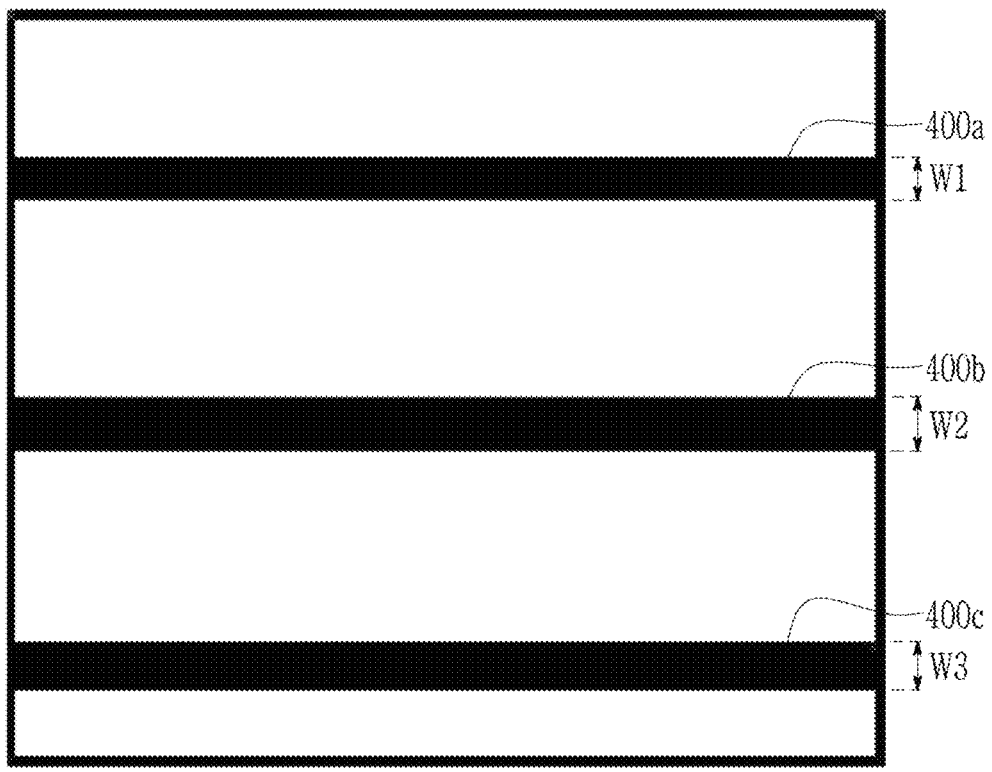

Now, an example of the inspection pattern portion 400 and a defective portion of the inspection apparatus 1000 for a display device according to an embodiment will be described with reference to FIG. 2 to FIG. 4 and FIG. 5 to FIG. 7. FIG. 2 to FIG. 4 each schematically illustrate an example of the inspection pattern portion 400 of the inspection apparatus 100 for a display device according to an embodiment, and FIG. 5 to FIG. 7 each schematically illustrate an image of a defective portion that has passed through the inspection pattern portion 400 of the inspection apparatus 100 for a display device according to an embodiment. In FIG. 2 to FIG. 4, the light-transmitting portion may be marked in white, and the light-blocking portion may be marked in black.

Referring to FIG. 2, the inspection pattern portion 400 includes multiple light-transmitting portions, and the light-transmitting portions may be arranged in a line to form a constant interval, while the light-transmitting portions may have a rectangular planar shape.

Referring to FIG. 3, the inspection pattern portion 400 may include multiple linear light-transmitting portions extending in a same direction. A distance between the linear light-transmitting portions may not be constant, and may vary depending on a position thereof. Accordingly, the light passing through the inspection pattern portion 400 may be a sinusoidal pattern having a form of a sine wave.

Referring to FIG. 4, the inspection pattern portion 400 may include multiple linear light-transmitting portions extending in a same direction. A distance between the linear light-transmitting portions may be constant. However, the disclosure is not limited thereto, and the distance between the linear light-transmitting portions may be different.

For example, the inspection pattern portion 400 may include a first light-blocking pattern portion 400a, a second light-blocking pattern portion 400b, and a third light-blocking pattern portion 400c, and a first width W1 of the first light-blocking pattern portion 400a, a second width W2 of the second light-blocking pattern portion 400b, and a third width W3 of the third light-blocking pattern portion 400c may be the same as or different from each other.

A pattern change observed in a defective portion of the target display device 100 to be inspected in case that the defective portion is positioned at a portion corresponding to a center portion of the inspection pattern portion 400 will be described with reference to FIG. 5 to FIG. 7.

Figure 5:
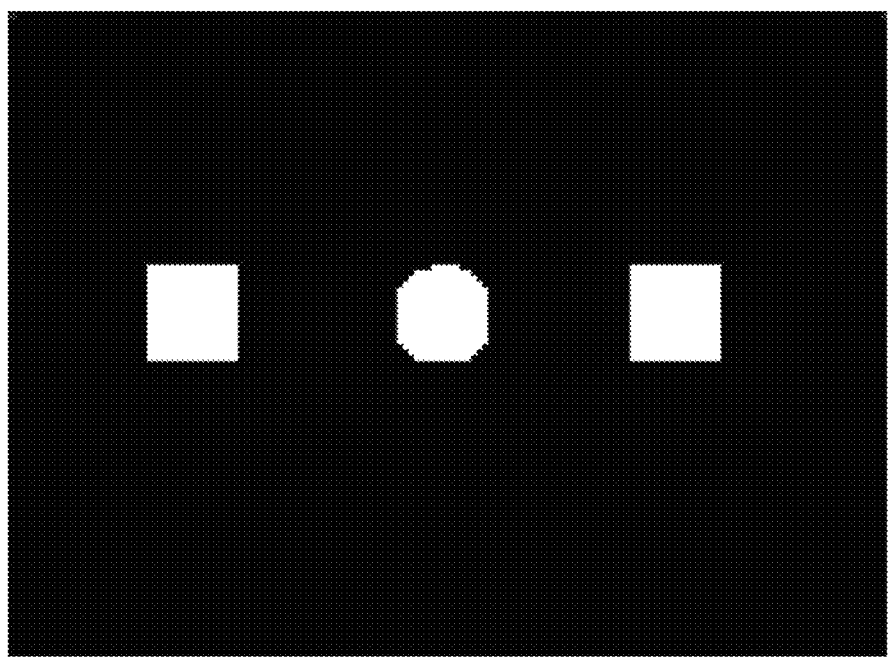
FIG. 5 to FIG. 7 each schematically illustrate an image of a defective portion that has passed through an inspection pattern portion of an inspection apparatus for a display device according to an embodiment.

Referring to FIG. 5, in case that light passing through linear light-transmitting portions of the inspection pattern portion 400 is reflected from a defective portion of the target display device 100 to be inspected, a planar shape of the portion corresponding to the defective portion may be changed. For example, a rectangular planar shape of the light-transmitting portion of the inspection pattern portion 400 may be changed to a circular shape in the defective portion.

Figure 6:
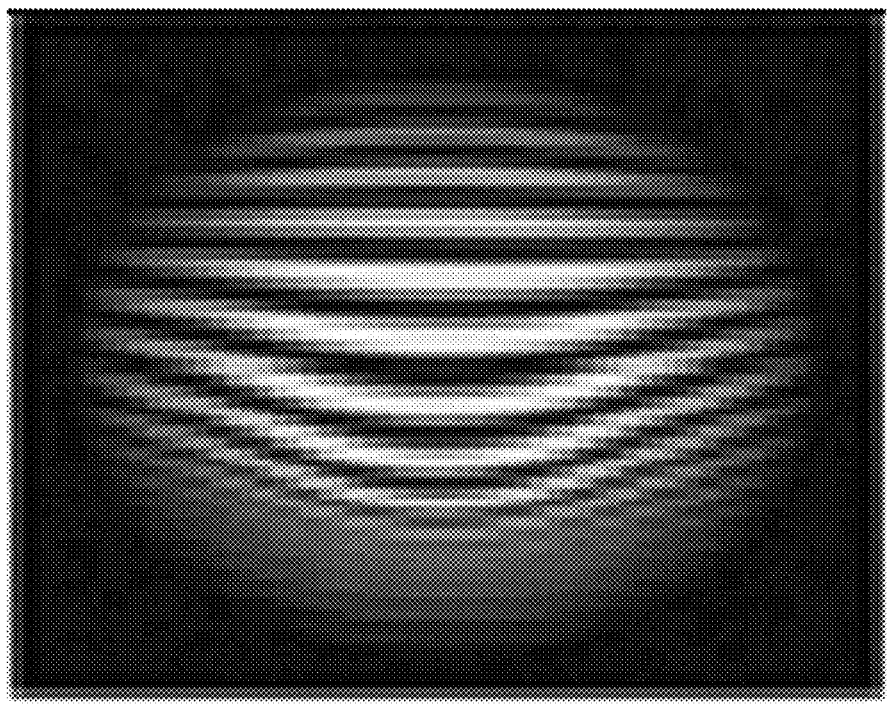
Figure 7:

Referring to FIG. 6 and FIG. 7, in case that light passing through linear light-transmitting portions of the inspection pattern portion 400 is reflected from a defective portion of the target display device 100 to be inspected, a planar shape may change from a portion corresponding to the defective portion to a curved shape.

Figure 8:
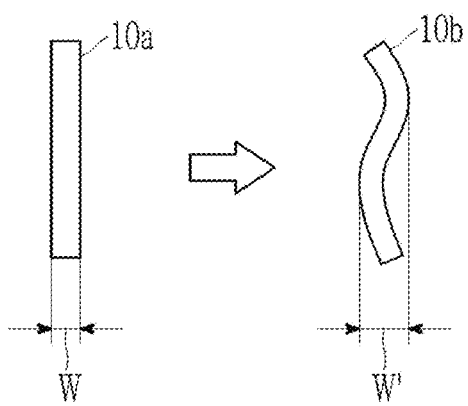
FIG. 8 to FIG. 10 schematically illustrate examples of quality inspection performed by an inspection apparatus for a display device according to an embodiment.
Figure 9:
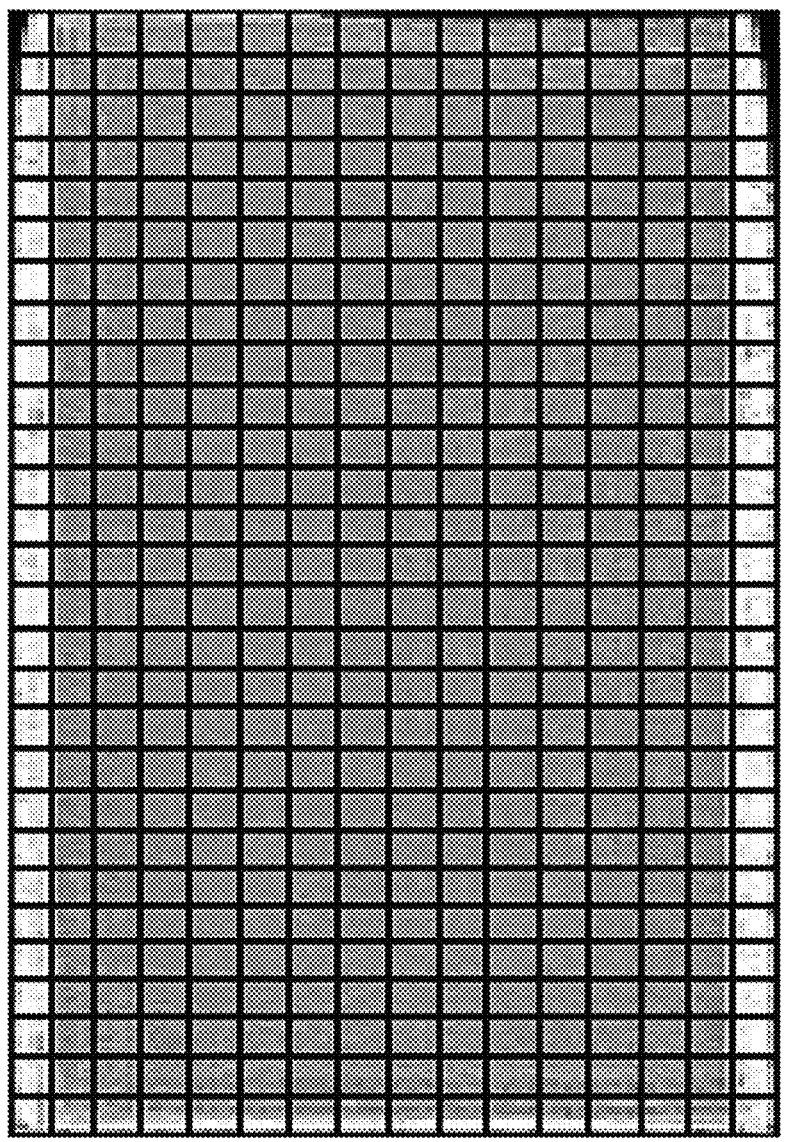
Figure 10:
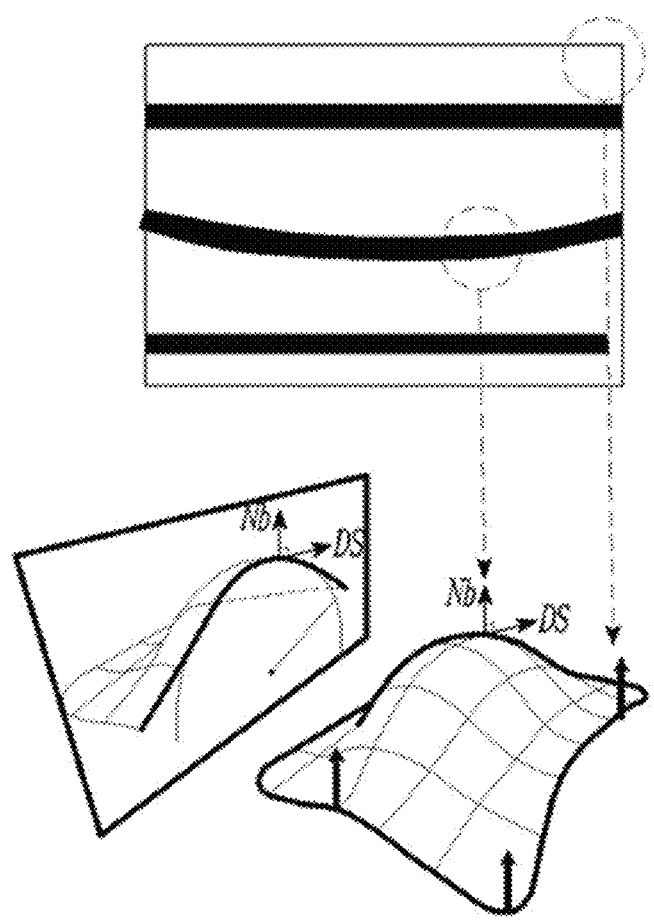

An example of quality inspection performed by the inspection apparatus 1000 for a display device according to an embodiment will be described with reference to FIG. 8 to FIG. 10. FIG. 8 to FIG. 10 schematically illustrate examples of quality inspection performed by the inspection apparatus 1000 for a display device according to an embodiment.

Referring to FIG. 8, the inspection apparatus 1000 for a display device according to an embodiment may measure a degree of linear distortion of a reflection pattern of light reflected from a surface of the target display device 100 to be inspected.

More specifically, as illustrated in FIG. 8, in case that the light passing through a linear inspection pattern 10*a* of the inspection pattern portion 400 is reflected on the surface of the target display device 100 to be inspected so as to deform a reflection pattern 10*b* in a shape instead of in a linear form, a pattern width thereof may be changed. For example, the linear inspection pattern 10*a* of the inspection pattern portion t 400 may have a first width W, but the reflection pattern 10*b* may have a second width W' that may be wider than the first width W. For example, the first width W of the linear inspection pattern 10*a* may be about 0.8 mm.

It may be determined that a defect has occurred at a corresponding position as a value, obtained by calculating a ratio (R=(W/W')×100) of the first width W of the linear inspection pattern 10*a* to the second width W' of the reflection pattern 10*b* for each position of the display device 100 by using the calculator 600*a* of the processor 600, may be smaller.

Whether the reflection pattern 10*b* may be deformed with respect to the linear inspection pattern 10*a* may be measured in a line along a portion of the surface of the display device 100.

Whether the reflection pattern 10*b* may be deformed with respect to the linear inspection pattern 10*a* may be measured along a direction parallel to an edge of the display device 100, or may be measured along a direction forming about 45 degrees with the edge of the display device 100. Whether the reflection pattern 10*b* may be deformed with respect to the linear inspection pattern 10*a* may be measured along a position passing through a center of the display device 100.

Referring to FIG. 9 and FIG. 10, the inspection apparatus 1000 for a display device according to an embodiment may measure refracting power, e.g., surface waviness, of the surface of the target display device 100 to be inspected.

The inspection apparatus 1000 for a display device according to an embodiment may divide a surface of the display device 100 into multiple measurement areas that may be divided in a grid shape having an interval as illustrated in FIG. 9, and may measure whether a surface of each of the measurement areas may be deformed.

A size of each of the measurement areas may be greater than or equal to a resolution that can be measured by the measurement portion 500 of the inspection apparatus 1000. The size of the measurement area may vary depending on a size and a viewing distance of the target display device 100 to be inspected. For example, the size of the measurement area may be 0.1 mm×0.1 mm to 10 mm×10 mm. Data related to the size of the measurement area may be included in the processor 600, and for example, the size of the display device 100 and viewing distance data depending on the size of the display device 100 and data of the measurement areas may be included in the processor 600.

In case that deformation occurs on the surface of the measurement area, light reflected from the surface of the measurement area may be refracted. As such, in case that light is refracted in the measurement area, as illustrated in FIG. 10, the refracting power of the surface of the display device 100 may be calculated by measuring a direction and a magnitude of a normal vector Nb that may be perpendicular to a tangent DS contacting the surface of the measurement area. For example, the refracting power may be a diopter value. Calculation of the refracting power may be performed by using the calculator 600*a* of the processor 600.

As such, a change in refracting power of each measurement area may be measured by calculating the difference between a maximum value and a minimum value of the refracting power measured in each measurement area of the surface of the display device 100 by using the calculator 600*a* of the processor 600, and an occurrence degree of refraction of the surface of the display device 100 may be measured by calculating an overall average value of the refracting power measured in each measurement area of the surface of the display device 100.

A measurement area in which a magnitude of the refracting power may be large may be determined by using refracting power values measured in each measurement area of the surface of the display device 100 described above, an area with such large refracting power may be classified as a defective area, and it may be determined that orange peel has occurred in such a portion. A defect rate of the target display device 100 to be inspected may be measured through a ratio value obtained by calculating a ratio of an area of a portion where the orange peel may be generated to a total surface area of the display device 100 by using the calculator 600*a* of the processor 600.

The processor 600 of the inspection apparatus 1000 for a display device may have an abnormal area index capable of automatically determining an abnormal defect area of a portion in which an abnormal singularity occurs by measuring light reflected from the surface of the display device 100, and may determine a corresponding abnormal area index value by using data measured by the measurement portion 500. For example, in case that an abnormal area index value for reflected light for a measurement area has a certain value or more, the processor 600 may determine that an abnormal defect has occurred in the corresponding measurement area.

As such, it may be determined whether not only linear distortion occurring on the surface of the display device 100 but also whether planar distortion occurs by combining a linear distortion degree of a reflection pattern of light reflected from the surface of the display device 100 described with reference to FIG. 8 and the refracting power measured in each measurement area of the surface of the display device 100 together.

Figure 11:
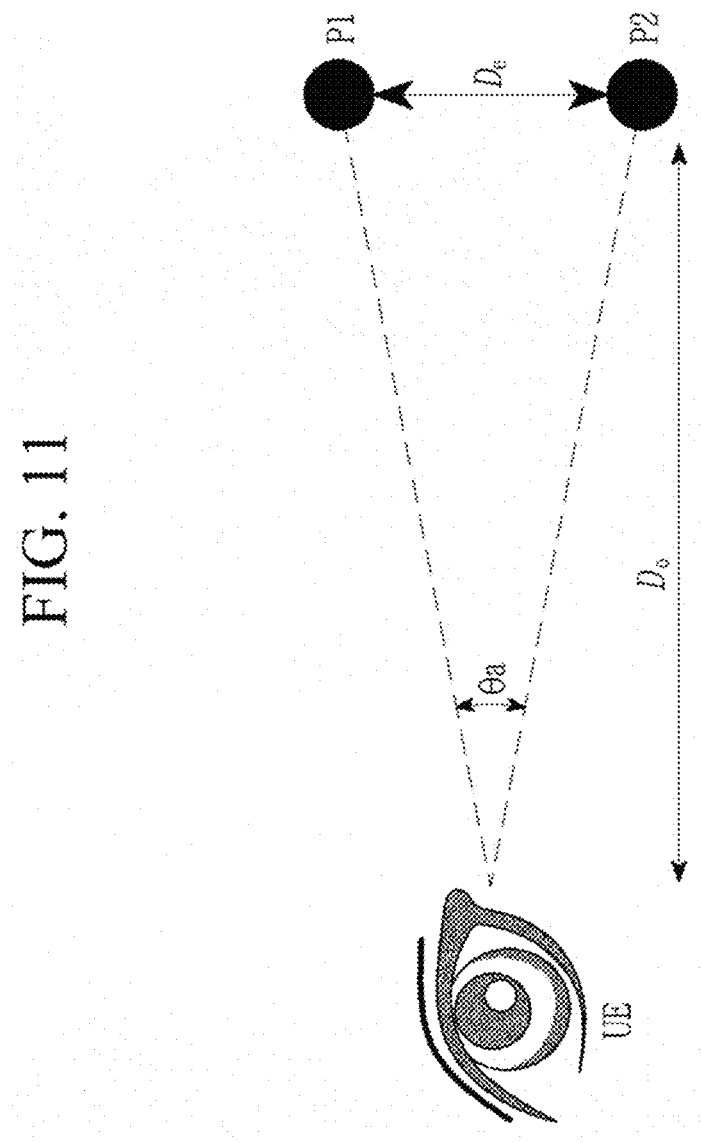
FIG. 11 conceptually illustrates an observation interval and an observation angle depending on a distance between a user and a display device.

Now, calibration data of the calibration data portion 600*b* included in the processor 600 of the inspection apparatus 1000 for a display device according to an embodiment will be described with reference to FIG. 11. FIG. 11 conceptually illustrates an observation interval and an observation angle depending on a distance between a user and a display device.

The calibration data may be data collected by using data measured by the measurement portion 500 of the inspection apparatus 1000 for a display device and data actually observed by users.

First, referring to FIG. 11, an observation distance De and an observation angle θa between two points P1 and P2 that can be observed by a user may be different depending on a first interval Do between a user eye UE and the target display device 100 to be inspected, which may be observed. As a size of the display device 100 increases, a user can use the display device 100 at a position having a large first distance Do, while as the size of the display device 100 decreases, the user can use the display device 100 at a position having a small first distance Do. For example, a viewing distance of a large television may be greater than that of a laptop computer or tablet.

As the first distance Do between the user eye UE and the display device 100, which may be observed, increases, the observation distance De between the two points P1 and P2 that the user can observe may increase. Conversely, as the first distance Do between the user eye UE and the display device 100, which may be observed, decreases, the observation distance De between the two points P1 and P2 that the user can observe may decrease.

Accordingly, the size of the observation area of the target display device 100 to be inspected may be set differently depending on the size of the target display device 100 to be inspected.

Data related to a difference between observed and measured values may be collected by setting the size of the observation area of the target display device 100 to be inspected depending on the size of the target display device 100 to be inspected, and comparing a value obtained by observing linear distortion and planar distortion in the observation area of the target display device 100 to be inspected by users with a degree of linear distortion of a reflection pattern of light reflected from the surface of the display device 100 and a value of a planar distortion degree using the refracting power measured in each measurement area of the surface of the display device 100 through the inspection apparatus 1000.

As such, the collected data may be calibration data of the calibration data portion 600b included in the processor 600 of the inspection apparatus 1000 for a display device according to an embodiment. However, the calibration data of the inspection apparatus 1000 for a display device according to an embodiment is not limited thereto, and various data using a defect observed by an actual user may be used.

As described above, the calibrator 600c of the processor 600 of the inspection apparatus 1000 for a display device according to an embodiment may calibrate a quality inspection result measured by the measurement portion 500 of the inspection apparatus 1000 for a display device and calculated by the calculator 600a by using calibration data stored in the calibration data portion 600b.

Multiple layers, such as signal lines, transistors, and emission layers, may be stacked inside the display device, and a number or a thickness of the layers may be different depending on positions. Accordingly, a quality inspection result measured on the outer surface of the display device and a distortion result of reflected light that the user can actually visually recognize from the outside may be different from each other.

However, the inspection apparatus 1000 for a display device according to an embodiment may calibrate a quality inspection result measured by the measurement portion 500 by using data observed by a real user, by including the processor 600 including the calibration data portion 600b and the calibrator 600c in which calibration data may be stored in addition to the measurement portion 500 for measuring the reflected light reflected from the surface of the target display device 100 to be inspected, thereby reducing a difference between a surface quality inspection result measured on the outer surface of the display device and a distortion result of light that the user can actually visually recognize from the outside and increasing accuracy of the quality inspection result.

Figure 12:
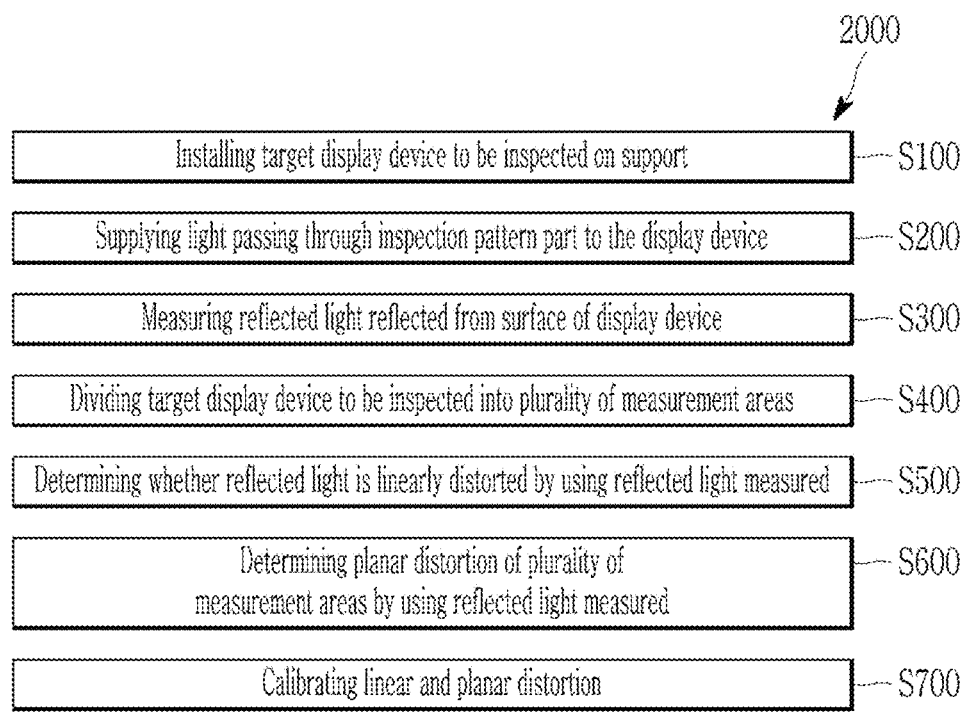
FIG. 12 illustrates a flowchart showing an inspection method of a display device according to an embodiment.

An inspection method 2000 for a display device using the inspection apparatus 1000 for a display device according to an embodiment will be described with reference to FIG. 12 together with FIG. 1 to FIG. 11 described above. FIG. 12 illustrates a flowchart showing an inspection method of a display device according to an embodiment.

Referring to FIG. 12, an inspecting method 2000 of a display device according to an embodiment may include installing the target display device 100 to be inspected on the support 200 of the inspection apparatus 1000 for a display device (S100).

The inspection method of a display device according to an embodiment may include supplying the light passing through the inspection pattern portion 400 to the display device 100 using the light supplier 300 after positioning the inspection pattern portion 400 to be inclined to form the first angle $\theta 1$ with a surface of the display device 100 (S200).

The inspection pattern portion 400 may include light-blocking portions arranged to have an interval and a light-transmitting portion between two adjacent light-blocking portions. The interval between the adjacent light-transmitting portions of the inspection pattern portion 400 may not be constant, and thus light passing through the inspection pattern portion 400 may be a sinusoidal pattern in the form of a sine wave. Unlikely, the inspection pattern portion 400 may include light-transmitting portions having a uniform planar shape and positioned at a regular interval. For example, the light-transmitting portion may have a polygonal planar shape such as a quadrangle.

The inspection pattern portion 400 may be inclined to form a first angle $\theta 1$ with the surface of the display device 100. More specifically, the inspection pattern portion 400 may be inclined such that a first direction DR1 perpendicular to the surface of the display device 100 and the second direction DRz perpendicular to the surface of the inspection pattern portion 400 form the first angle $\theta 1$.

The first angle $\theta 1$ may be about 0 degrees to about 45 degrees, and in an embodiment, may be greater than about 0 degrees and less than about 30 degrees.

The inspection method of a display device according to an embodiment may include measuring reflected light reflected from the surface of the display device 100 by using the measurement portion 500 (S300).

Light incident on the surface of the display device 100 to form the first angle $\theta 1$ with respect to the first direction DR1 that may be perpendicular to the surface of the display device 100 may be reflected from the surface of the display device 100 in a direction forming the first angle $\theta 1$ with respect to the first direction DR1, and the measurement portion 500 may measure reflected light reflected from the surface of the display device 100.

The inspection method of a display device according to an embodiment may include dividing the target display device 100 to be inspected into multiple measurement areas (S400).

As illustrated in FIG. 9, the surface of the display device 100 may be divided into multiple measurement areas that may be divided in a grid shape having an interval. A size of each of the measurement areas may be greater than or equal to a resolution that can be measured by the measurement portion 500 of the inspection apparatus 1000. The size of the measurement area may vary depending on a size and a viewing distance of the target display device 100 to be inspected.

As described with reference to FIG. 11, as a size of the display device 100 increases, a user can use the display device 100 at a position having a large first distance Do, while as the size of the display device 100 decreases, the user can use the display device 100 at a position having a small first distance Do. As the first distance Do between the user eye UE and the display device 100, which may be observed, increases, the observation distance De between the two points P1 and P2 that the user can observe may increase. Conversely, as the first distance Do between the user eye UE and the display device 100, which may be observed, decreases, the observation distance De between the two points P1 and P2 that the user can observe may decrease.

Accordingly, the size of the measurement area of the target display device 100 to be inspected may be set differently depending on the size of the target display device 100 to be inspected.

For example, the size of the measurement area may be 0.1 mm×0.1 mm to 10 mm×10 mm. Data related to the size of the measurement area may be included in the processor 600, and for example, the size of the display device 100 and viewing distance data depending on the size of the display device 100 and data of the measurement areas may be included in the processor 600.

The method of inspecting a display device according to an embodiment may include determining whether the reflected light may be linearly distorted by using reflected light data measured by the measurement portion 500 (S500).

As described with reference to FIG. 8, the calculator 600*a* of the processor 600 may determine that a defect has occurred at a corresponding position by calculating a ratio (R=(W/W')×100) of the first width W of the linear inspection pattern 10*a* to the second width W' of the reflection pattern 10*b* for each position of the display device 100 by using the first width W of the linear inspection pattern 10*a* of the inspection pattern portion 400 and the second width W' of the reflection pattern 10*b* measured by the measurement portion 500.

Whether the reflection pattern 10*b* may be deformed with respect to the linear inspection pattern 10*a* may be measured in a line along a portion of the surface of the display device 100. For example, whether the reflection pattern 10*b* may be deformed with respect to the linear inspection pattern 10*a* may be measured along a direction parallel to an edge of the display device 100, or may be measured along a direction forming about 45 degrees with the edge of the display device 100. Whether the reflection pattern 10*b* may be deformed with respect to the linear inspection pattern 10*a* may be measured along a position passing through a center of the display device 100.

An inspection method of a display device according to an embodiment may include determining planar distortion of measurement areas by using data of reflected light measured by the measurement portion 500 (S600).

Refracting power of light reflected from surfaces of the measurement areas may be calculated. For example, as illustrated in FIG. 10, the refracting power of the surface of the display device 100 may be calculated by measuring a direction and a magnitude of a normal vector Nb that may be perpendicular to a tangent DS contacting the surface of the measurement area. The refracting power may be a diopter value, and the calculation of the refracting power may be performed by using the calculator 600*a* of the processor 600.

As such, a change in refracting power of each measurement area may be measured by calculating the difference between a maximum value and a minimum value of the refracting power measured in each measurement area of the surface of the display device 100 by using the calculator 600*a* of the processor 600, and an occurrence degree of refraction of the surface of the display device 100 may be measured by calculating an overall average value of the refracting power measured in each measurement area of the surface of the display device 100.

An area with such large refracting power may be classified as a defective area, and it may be determined that orange peel has occurred in such a portion. A defect rate of the target display device 100 to be inspected may be measured through a ratio value obtained by calculating a ratio of an area of a portion where the orange peel may be generated to a total surface area of the display device 100 by using the calculator 600*a* of the processor 600.

It may be possible to determine whether an abnormal defect has occurred in a corresponding measurement area by using data measured by the measurement portion 500, thereby determining a ratio of the measurement area in which the abnormal defect occurs. For example, in case that the ratio of the measurement area in which the abnormal of the reflected light has a value that may be greater than a value, it may be determined that a visible quality defect has occurred on the surface of the corresponding display device 100.

The method of inspecting a display device according to an embodiment may include calibrating measured and calculated linear and planar distortion by using calibration data of the calibration data portion 600*b* of the processor 600 (S700).

The calibrator 600*c* of the inspection apparatus 1000 for a display device according to an embodiment may calibrate a quality inspection result measured by the measurement portion 500 of the inspection apparatus 1000 for a display device and calculated by the calculator 600*a* by using calibration data stored in the calibration data portion 600*b*.

The calibration data stored in the calibration data portion 600*b* of the inspection apparatus 1000 for a display device according to an embodiment may be data related to a difference between observed and measured values by setting the size of the observation area of the target display device 100 to be inspected depending on the size of the target display device 100 to be inspected, and comparing a value obtained by observing linear distortion and planar distortion in the observation area of the target display device 100 to be inspected by users with a degree of linear distortion of a reflection pattern of light reflected from the surface of the display device 100 and a value of a planar distortion degree using the refracting power measured in each measurement area of the surface of the display device 100 through the inspection apparatus 1000. However, the calibration data of the inspection apparatus 1000 for a display device according to an embodiment is not limited thereto, and various data using a defect observed by an actual user may be used.

The inspection method for a display device, including the determining of whether the reflected light may be linearly distorted by using the reflected light data measured by the measurement portion 500 (S500), the determining of the planar distortion of the measurement areas by using the data of the reflected light measured by the measurement portion 500 (S600), and the calibrating of the measured and calculated linear and planar distortion by using the calibration data of the calibration data portion 600*b* of the processor 600 (S700) according to an embodiment described above may be performed in the calculator 600*a* and the calibrator 600*c* of the processor 600, and the calculator 600*a* and the calibrator 600*c* of the processor 600 may be algorithmized programs, but the disclosure is not limited thereto.

The inspection method for a display device according to an embodiment may include calibrating a quality inspection result measured by the measurement portion 500 using data observed by real users by using the processor 600 including the calibration data portion 600*b* and the calibrator 600*c* in which calibration data may be stored, thereby increasing accuracy of quality inspection results by reducing a difference between a surface quality inspection result measured on the outer surface of the display device and a distortion result of light that the user can actually visually recognize from the outside.

Figure 13:
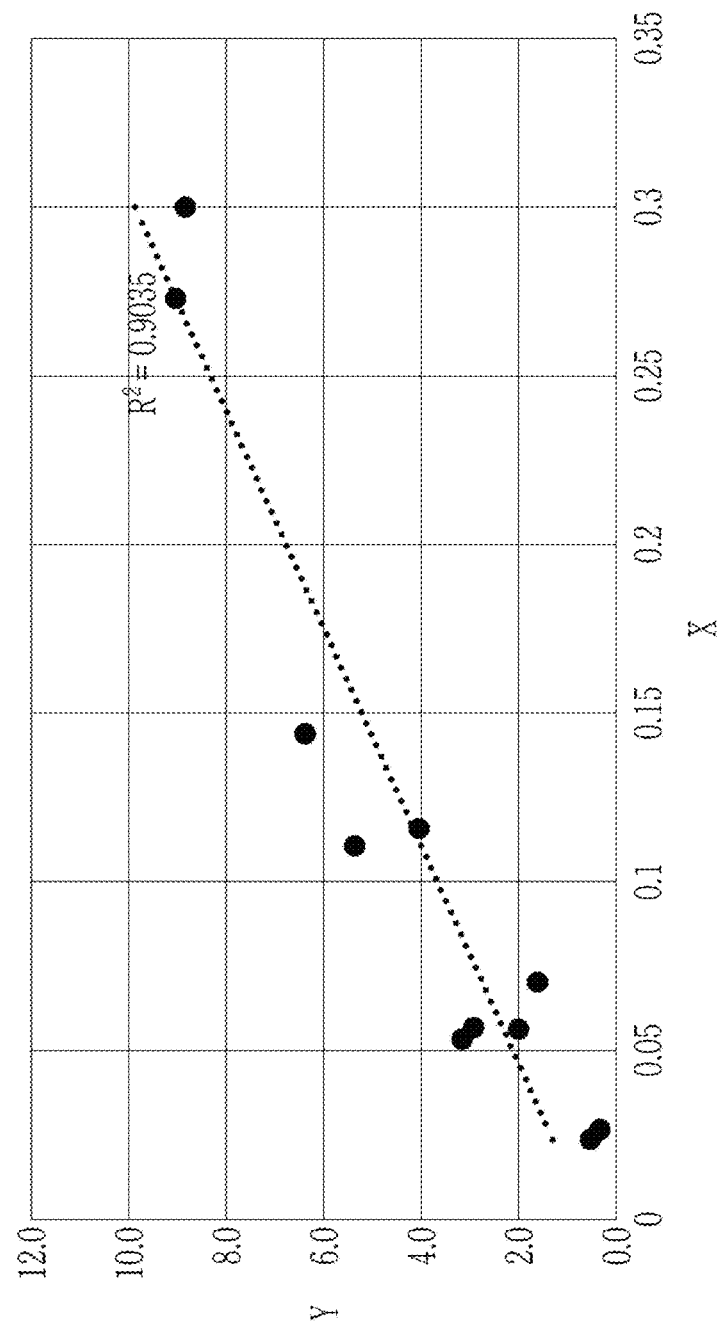
FIG. 13 and FIG. 14 each schematically illustrate a graph showing a result of an experimental example.
Figure 14:
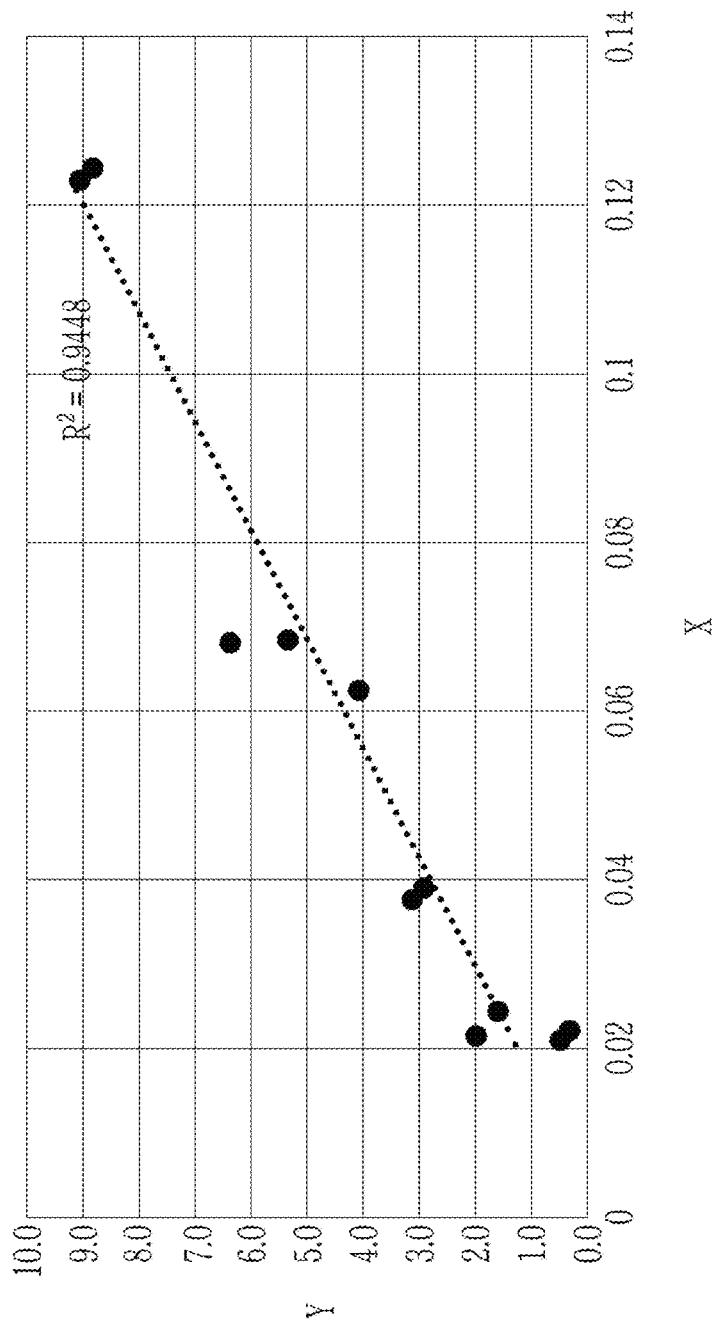

Now, a result of one experimental example will be described with reference to Table 1 together with FIG. 13 and FIG. 14. FIG. 13 and FIG. 14 each schematically illustrate a graph showing a result of an experimental example.

In this experimental example, a first case, a second case, and a third case for respectively dividing the surface of the display device 100 into measurement areas of 3 mm×3 mm, 5 mm×5 mm, and 10 mm×10 mm were provided. A quality inspection result measured by the inspection apparatus 1000 for a display device was compared with a quality observation result observed by an actual observer to calculate a ratio between the measured quality inspection result and the observation result for a case C1 before calibration without performing the calibrating of the measured and calculated linear and planar distortion by using the inspection apparatus 1000 for a display device according to an embodiment (S700) and a case C2 after calibration of the measured and calculated linear and planar distortion (S700).

The results are shown in Table 1 below, and the results of the second case are graphically shown in FIG. 13 and FIG. 14.

In Table 1, as a numerical value may be closer to 1, this indicates that a deviation between the quality inspection result measured by the inspection apparatus 1000 for a display device and the quality observation result observed by an actual observer may be small, and they coincide with each other.

TABLE 1

|  | First case | Second case | Third case |
|---|---|---|---|
| c1 before calibration | 0.9042 | 0.9035 | 0.8775 |
| c2 after calibration | 0.9368 | 0.9448 | 0.9197 |

Referring to Table 1, it can be seen that deviation between the quality inspection result measured by the inspection apparatus 1000 for a display device and the quality observation result observed by an actual observer may be small, and they coincide with each other in the case C2 after the calibration of the measured and calculated linear and planar distortion (S700) compared with the case C1 before the calibration of the measured and calculated linear and planar distortion (S700), for the first case, the second case, and the third case for respectively dividing the surface of the display device 100 into measurement areas of 3 mm×3 mm, 5 mm×5 mm, and 10 mm×10 mm. FIG. 13 shows a result of the case c1 before the calibration, and FIG. 14 shows a result of the case c2 after the calibration. In FIG. 13 and FIG. 14, an X-axis indicates a relative value of the surface quality defect measured by the inspection apparatus 1000 for a display device, and a Y-axis indicates a relative value of the surface quality defect observed by an actual observer. A dotted line illustrated in FIG. 13 and FIG. 14 indicates a line in which a value measured by the inspection apparatus 1000 for a display device coincides with a quality observation result value observed by an actual observer. Accordingly, in FIG. 13 and FIG. 14, points showing data may be close to the dotted line, and this indicates that the deviation between the quality inspection result measured by the inspection apparatus 1000 for a display device and the quality observation result observed by an actual observer may be small.

By referring to FIG. 13 and FIG. 14, it can be seen that deviation between the quality inspection result measured by the inspection apparatus 1000 for a display device and the quality observation result observed by an actual observer may be small in the case C2 after the calibration of the measured and calculated linear and planar distortion (S700) compared with the case C1 before the calibration of the measured and calculated linear and planar distortion (S700).

As described above, in accordance with the inspection apparatus 1000 for a display device and the inspection method of the display device according to an embodiment, it may be possible to reduce the difference between the surface quality inspection result measured on the outer surface of the display device and the distortion result of light that the user can actually visually recognize from the outside by calibrating the quality inspection result measured by the inspection apparatus 1000 for a display device using calibration data based on data observed by an actual observer, thereby increasing the accuracy of the quality inspection result.

While this disclosure has been described in connection with what is considered to be practical embodiments, it is to be understood that the invention is not limited to the disclosed embodiments, but, on the contrary, is intended to cover various modifications and equivalent arrangements.

What is claimed is:

1. An inspection apparatus for a display device, comprising:
   a light supplier that supplies light to a surface of the display device;
   an inspection pattern portion between the display device and the light supplier;
   a measurement portion that measures reflected light reflected from the surface of the display device; and
   a processing portion that processes data of the reflected light measured by the measurement portion, wherein
   the processing portion includes:
      a processor;
      a calibration data portion including calibration data; and
      a calibrator calibrating the data by using the calibration data of the calibration data portion,
   the measurement portion includes a camera that detects the reflected light, and
   the inspection pattern portion includes:
      light-blocking portions arranged to have an interval; and
      light-transmitting portions positioned between adjacent ones of the light-blocking portions.

2. The inspection apparatus of claim 1, wherein a first direction that is perpendicular to the surface of the display device and a second direction that is perpendicular to a surface of the inspection pattern portion form an angle with each other.

3. The inspection apparatus of claim 2, wherein the angle is in a range of about 0 degrees to about 45 degrees.

4. The inspection apparatus of claim 3, wherein the angle is in a range of about 0 degrees to about 30 degrees.

5. The inspection apparatus of claim 2, wherein the light-transmitting portions have a uniform shape in a plan view and are disposed at a regular interval.

6. The inspection apparatus of claim 2, wherein the processing portion includes an algorithmized program.

7. The inspection apparatus of claim 2, wherein the processing portion detects linear distortion of the reflected light and planar distortion of the reflected light.

8. The inspection apparatus of claim 7, wherein the processing portion determines the linear distortion of the reflected light by calculating a ratio of a width of the inspection pattern portion to a width of the reflected light.

9. The inspection apparatus of claim 7, wherein the planar distortion of the reflected light includes an orange peel and a refracting power of the reflected light.

10. The inspection apparatus of claim 7, wherein the processing portion determines whether the reflected light has an abnormal defect, and determines a ratio of the abnormal defect.

11. The inspection apparatus of claim 1, wherein a distance between the adjacent ones of the light blocking portions is different depending on positions of the adjacent ones.

* * * * *